Feb. 4, 1958 C. HARDEN ET AL 2,822,010
CITRUS JUICE EXTRACTING MACHINE
Original Filed Aug. 17, 1953 2 Sheets-Sheet 1

CARL HARDEN
GLEN L. STANSBURY
EUGENE L. KINGSBURY
INVENTORS

BY *Lyon & Lyon*

ATTORNEYS

Feb. 4, 1958 C. HARDEN ET AL 2,822,010
CITRUS JUICE EXTRACTING MACHINE
Original Filed Aug. 17, 1953

CARL HARDEN
GLEN L. STANSBURY
EUGENE L. KINGSBURY
INVENTORS

BY Lyon & Lyon
ATTORNEYS

United States Patent Office 2,822,010
Patented Feb. 4, 1958

2,822,010

CITRUS JUICE EXTRACTING MACHINE

Carl Harden, Whittier, Glen L. Stansbury, Ontario, and Eugene L. Kingsbury, La Habra, Calif., assignors to Brown Citrus Machinery Corporation, Whittier, Calif., a corporation of California Continuation of application Serial No. 374,748, August 17, 1953. This application November 9, 1956, Serial No. 621,473

2 Claims. (Cl. 146—72)

This invention relates to citrus juice extracting machines and has particular reference to improved apparatus for halving fruit preparatory to extraction of the juice therefrom.

One of the principal objects of this invention is to provide novel conveyor cup and halving knife structures combined in a citrus juice extracting machine.

Another object of this invention is to provide novel means for conveying and presenting whole fruit to a stationary knife blade for halving of the fruit.

Another object of this invention is to provide novel and improved apparatus for halving citrus fruit and for presenting the fruit halves to subsequent machine members.

Other objects and advantages of this invention, it is believed, will be readily apparent from the following detailed description of a preferred embodiment thereof when read in connection with the accompanying drawings.

Figure 1:
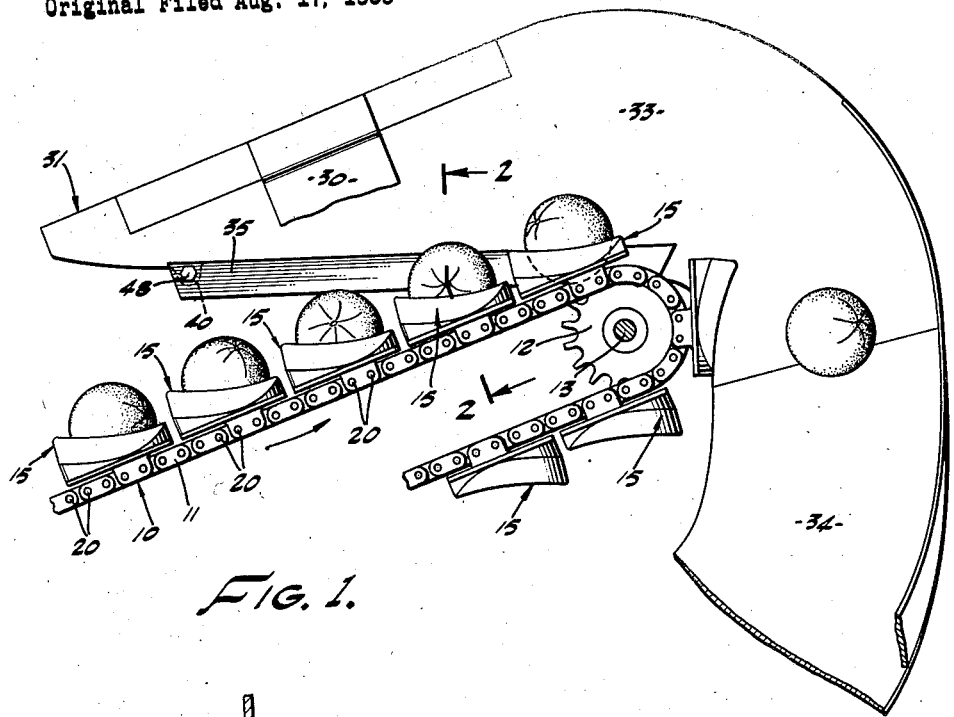
Figure 1 is a side elevation illustrating a portion of a citrus juice extracting machine embodying a preferred form of the invention.

The apparatus of this invention is adapted to be used in a citrus juice extracting machine of the type disclosed in United States Letters Patent No. 2,199,876, issued May 7, 1940, to William O. Brown. In the machine described therein, the fruit is halved and the halves fed, by sliding them across curved divider plates, into cups which grasp the fruit with the cut face downwardly and carry it into position for the reaming operation wherein rotating reamers enter the fruit. A plurality of cups are mounted upon a horizontal cup carrier unit which rotates on a vertical axis. Below the cup carrier unit is a reamer carrier unit which is mounted to rotate upon an inclined axis in synchronism with the cup unit so that each reamer enters a corresponding cup during a portion of its path of travel.

Referring now specifically to the drawings, the citrus juice extracting machine includes a whole fruit feeder conveyor generally indicated 10 and comprising a pair of spaced endless chains 11 extending between driven sprockets 12 and idler sprockets (not shown). The sprockets 12 are keyed to a shaft 13 preferably driven by the same motor (not shown) which drives the other machine members so that the conveyor 10 is synchronized therewith.

Extending between the endless chains 11 is a plurality of conveyor cups 15. As shown best in Figures 2 and 3, the cups are provided with side wing members 17 connected by a base portion 18, each wing having a longitudinal groove 19 in which is received one of the chains 11, the cups being secured thereto by means of pins 20 which also function to connect together adjacent chain links. Each of the cups 15 is provided with a fruit-receiving well 23 and has a central longitudinal groove 25 bisecting the well and extending into the base portion 18.

Figures 2, 3:
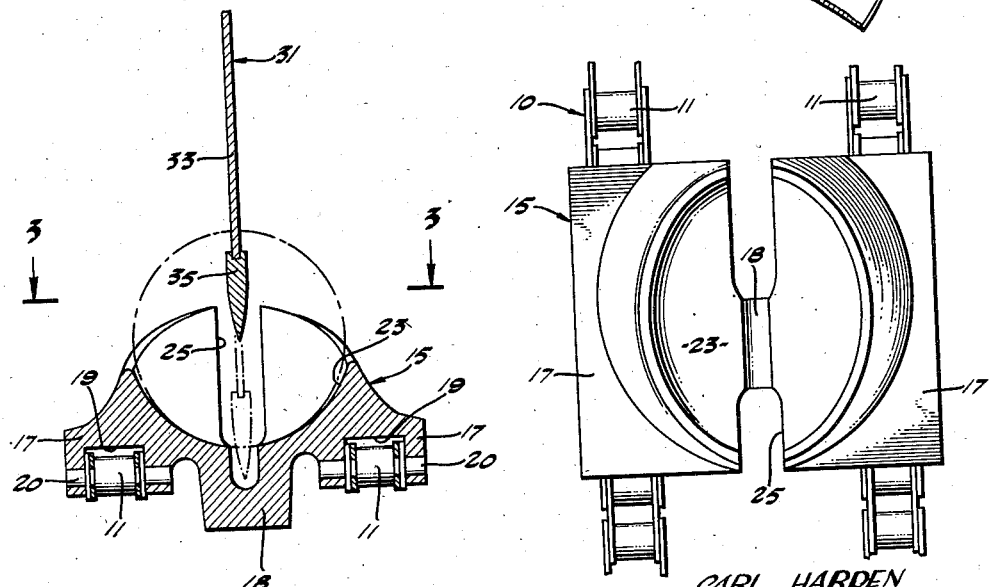
Figure 2 is a sectional elevation taken substantially on the line 2—2 of Figure 1.
Figure 3 is a top view, on an enlarged scale, of a whole fruit conveyor cup constructed in accordance with this invention.

The well 23 is of a shape generally similar to a segment of an oblate spheroid, being of elliptical configuration when viewed in plan, with the major axis extending longitudinally of the feeder conveyor 10, and being of segmental circular shape in vertical section (see Figure 2). As shown best in Figure 1, the angle of inclination of the feeder conveyor 10 is such, with respect to the disposition of the fruit-receiving wells 23, that the fruit tends to gravitate toward the leading or front portion of the cups.

Figure 6:
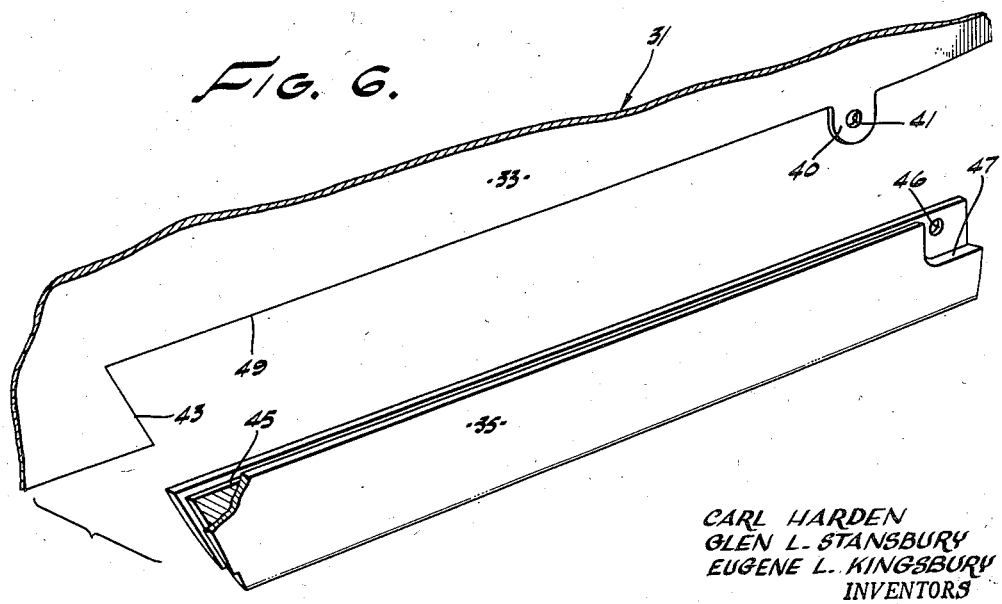
Figure 6 is an exploded detail view of the removable knife blade and blade extension member.

Mounted on the machine frame by means of a bracket member 30 is a vertical knife member 31. As shown in the drawings, the knife member is positioned above and centrally of the endless chains 11, and it comprises a knife extension element 33 of sheet metal or the like and a knife blade 35. Curved divider plates 34 lead from the extension element in both directions, the plates terminating in horizontal portions (not shown) adjacent reaming mechanisms (not shown) on either side of the machine. The blade is substantially thicker than the extension element and is removably secured thereto. As shown best in Figure 6, the extension element is provided with a depending tab portion 40 having a central aperture 41, and it is further provided with an inclined portion 43. The knife blade 35 has a central groove 45 extending along the top and rear edges thereof, and the blade is further provided with an aperture 46 and a cut-away portion 47 adapted to receive a bolt head 48. From an inspection of the drawings, it will be understood that groove 45 engages the lower edge 49 and inclined portion 43 of the extension element, and by virtue of this and the single bolt extending through the apertures 41 and 46, the knife blade and extension element are firmly maintained in assembled position.

Figure 4:
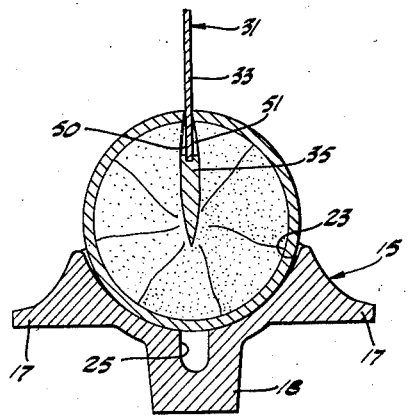
Figure 4 is a diagrammatic view, otherwise similar to Figure 2, but illustrating the position of the parts at a point wherein the fruit is partially halved.
Figure 5:
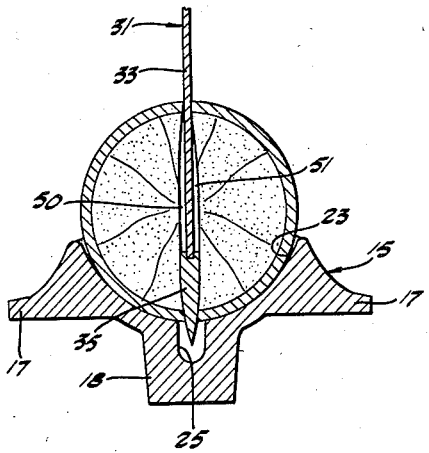
Figure 5 is a view similar to Figure 4, but illustrating the position of the parts after complete halving of the fruit.

In operation of the apparatus described, the whole citrus fruit is conveyed toward the knife member 31 by means of the feeder conveyor 10. Continued advancing of the fruit causes it to be halved by the knife blade 35 as shown in Figures 4 and 5, the blade entering the groove 25. Also as shown, the knife blade, being thicker than the extension element 33, causes air spaces 50 and 51 to be formed between the cut faces of the fruit halves and the surfaces of the extension element. These air spaces eliminate any initial tendency of the fruit halves to adhere or stick to the extension element surfaces, as would ordinarily occur due to the vacuum effect produced by the close contact between the wet faces of the fruit halves and the metal surfaces.

As indicated, the fruit tends to gravitate toward the front portion of the cups 15. However, as is apparent from an inspection of Figure 1, as each cup arrives at the top of its travel and begins to proceed around the sprocket 12, its position changes. By virtue of the elongated or elliptical configuration of the cup wells 23, the fruit is first rolled rearwardly and then released from the cups by a throwing action, thereby resulting in an increased speed of travel of the fruit.

It has been found that by the combination of the elongated-well conveyor cups and the thickened knife blade, superior operation of the citrus juice machine may be obtained, due primarily to the elimination of sticking of the fruit halves and the increased speed of travel thereof. In this manner, optimum conditions of machine capacity may be attained by proper synchronization of the various machine members. This is a continuation of our abandoned copending application Serial No. 374,748, filed August 17, 1953, on "Citrus Juice Extracting Machine."

While a specific embodiment of this invention has been shown and described, it is not intended to limit the same to the exact details of the construction set forth, and it embraces such changes, modifications and equivalents of the parts and their formation and arrangement as come within the purview of the appended claims.

We claim:

1. In a citrus fruit juice-extracting machine, the combination of an endless chain conveyor having an inclined upper run and a plurality of cups on said conveyor for conveying spherical fruits of substantially uniform diameter to a halving knife, said cups having a longitudinal groove for receiving said knife, each cup having a well shaped in substantially the form of a segment of an oblate spheroid and being of elliptical configuration when viewed in plan with the major axis extending longitudinally of the conveyor and of substantially greater length than the diameter of the fruit to be conveyed and having a segmental circular shape in vertical section transverse to said major axis, said vertical section having a radius of curvature just sufficiently greater than the radius of curvature of said fruit to permit said fruit to be received in said well, said cups being mounted at an angle with respect to said conveyor so that a plane tangent to the upper, forward and rear extremities of each cup forms an acute angle with the plane of the upper run of the conveyor whereby fruit received in said cups gravitates toward the front portion thereto while the said cups are on the upper run of said conveyor and said fruit in said cups upon contact with said halving knife is first rolled rearwardly and then released from the cups with a throwing action.

2. The combination defined in claim 1 including a stationary halving knife member mounted above and centrally of the discharge end of said conveyor, said knife member including an extension element, and a knife blade attached thereto, said knife blade being substantially thicker than said extension element.

References Cited in the file of this patent

UNITED STATES PATENTS

| | | |
|---|---|---|
| 2,130,610 | Brown | Sept. 20, 1938 |
| 2,242,244 | Ewald | May 20, 1941 |
| 2,650,428 | Epperson | Sept. 1, 1953 |

FOREIGN PATENTS

| | | |
|---|---|---|
| 287,494 | Germany | Sept. 24, 1915 |